US007135208B2

(12) United States Patent
Kubota

(10) Patent No.: US 7,135,208 B2
(45) Date of Patent: Nov. 14, 2006

(54) INK COMPOSITION AND INK SET

(75) Inventor: Kazuhide Kubota, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 93 days.

(21) Appl. No.: 10/748,110

(22) Filed: Dec. 30, 2003

(65) Prior Publication Data

US 2005/0075449 A1 Apr. 7, 2005

(30) Foreign Application Priority Data

Jan. 7, 2003 (JP) ............................ 2003-001029

(51) Int. Cl.
*C09D 11/10* (2006.01)
*B05D 5/00* (2006.01)
(52) U.S. Cl. .................. 427/256; 106/31.25; 106/31.6; 106/31.85; 106/31.86; 106/31.89; 427/427.4; 428/32.1
(58) Field of Classification Search ............. 106/31.25, 106/31.6, 31.85, 31.86, 31.89
See application file for complete search history.

(56) References Cited

U.S. PATENT DOCUMENTS

| 5,221,334 | A | * | 6/1993 | Ma et al. ..................... 524/167 |
| 6,087,614 | A | * | 7/2000 | Ishizuka et al. ........ 219/121.43 |
| 2002/0002930 | A1 | * | 1/2002 | Yamashita et al. .......... 106/31.6 |
| 2003/0226473 | A1 | * | 12/2003 | Ishimoto ..................... 106/31.6 |

FOREIGN PATENT DOCUMENTS

| JP | H9-188842 | 7/1997 |
| JP | H10-279871 | 10/1998 |
| JP | H11-349871 | 12/1999 |
| JP | 2001-272529 | 10/2001 |
| JP | 2001-354889 | 12/2001 |
| JP | 2002-138232 | 5/2002 |
| JP | 2003-107230 | 4/2003 |

OTHER PUBLICATIONS

CASregistry information for Silwet L7608.*
CAS registry information for Silwet L7602.*
Patent Abstract of Japan Publication No. 2002-138232 Published May 14, 2002.
Patent Abstract of Japan Publication No. 2001-354889 Published Dec. 25, 2001.
Patent Abstract of Japan Publication No. H11-349871 Published Dec. 21, 1999.
Patent Abstract of Japan Publication No. H9-188842 Published Jul. 22, 1997.
Patent Abstract of Japan Publication No. H10-279871 Published Oct. 20, 1998.
Patent Abstract of Japan Publication No. 2001-272529 Published Oct. 5, 2001.
Patent Abstract of Japan Publication No. 2003-107230 Published Apr. 9, 2003.

* cited by examiner

*Primary Examiner*—Marc S. Zimmer
(74) *Attorney, Agent, or Firm*—Ladas and Parry LLP

(57) ABSTRACT

It is an object of the present invention to reduce uneven glossiness of images formed with pigmented ink compositions on glossy inkjet media by setting the type of surfactant and the content of an alkanediol and a glycol ether. The ink composition of the present invention contains a pigment, an alkanediol, a glycol ether, a polyether-modified polysiloxane compound, a water-soluble organic solvent, and water, and the sum of the contents of alkanediol and glycol ether is 10 wt % or more, but less than 20 wt %.

11 Claims, No Drawings

INK COMPOSITION AND INK SET

BACKGROUND OF THE INVENTION

1. Field of the Invention

The present invention relates to an ink composition, particularly to an ink composition that results in a good glossiness on glossy media and solves the problem of uneven glossiness by reducing the differences in glossiness between the colors, and an ink set having such ink composition.

2. Description of Prior Art

An inkjet recording method is a method of printing by jetting drops of an ink composition onto a recording medium such as paper. A feature of this method is that high-resolution and high-quality images can be printed at high speed using a relatively inexpensive apparatus. Ink compositions commonly used in the inkjet recording method typically contain water as their main ingredient, mixed together with coloring components and wetting agents such as glycerin to prevent clogging. Dye inks and pigmented inks can be used as colorants. However for printed matter, since pigmented inks are superior to dye inks in terms of weathering resistance such as light fastness, water fastness and gas fastness, the demand for pigmented inks is increasing. Therefore, the development of pigmented inks in which the characteristics of pigments are utilized, has been in progress.

With recent innovative improvements in inkjet recording technology, the inkjet recording method has been applied in the field of high-definition printing that had already been achieved with the silver halide photo printing method and the offset printing method. Accordingly, developments have also been made in the area of inkjet recording media where high glossiness comparable to photographic paper and art paper which are used in the silver halide photo printing method and the offset printing method, has been achieved. As for high-glossy recording media for inkjet printing, the mainstream is a substrate (e.g., paper, film, etc.) having thereon an ink-absorbing layer that contains porous material such as porous silica.

When forming color images using the inkjet recording method, ink compositions of three colors, yellow, magenta, and cyan, are used, or in some cases, four colors including a black ink composition. There are also cases where a light cyan ink composition and a light magenta ink composition are added to the four ink compositions listed above, so that color images are formed by using six colors. When printing to a recording medium using a plurality of color ink compositions, if the respective ink compositions have widely differing ink penetrations (i.e., ink absorption speeds) into the recording medium, the printed images usually suffer from bleeding, uneven colors, uneven flocculation, and uneven glossiness, thus the quality of the recorded images is reduced.

Compared to dye inks, pigmented inks in which pigments serve as colorants are more prone to uneven flocculation, since the pigments are layered on the surface of a recording medium.

According to the definition in Patent Laid-Open Publication No. 2002-138232, color unevenness refers to the unevenness in the image quality when overlapping colors as secondary and tertiary colors due to the ink components having different absorption speeds, respectively. Uneven flocculation refers to image ruoughness (graininess) when dots of different colors overlap each other due to the respective ink components having different absorption speeds. Uneven glossiness refers to the differences in glossiness due to the differences in absorption speeds between the respective ink components.

As a solution for these problems, the same patent teaches that, in an ink set having multiple pigmented ink compositions, the absorption coefficients of the respective ink compositions are limited within a predetermined range, so that uneven colors, uneven flocculation, and uneven glossiness are reduced. The absorption coefficients are indicated in the testing method approved by the Japan Technical Association of the Pulp and Paper Industry, that is, "Bristow's method" (JAPAN TAPPI No.51) (for example, see page 350 of *Shin Kami no Kagaku* (*New Science of Paper*) 4th edition, co-written by Takashi Kadoya et al.).

The same patent discloses an ink composition containing, as a penetrating agent, an acetylene glycol compound and a polyhydric alcohol alkyl ether derivative having three or more carbons.

A number of pigmented ink compositions using pigments as colorants have been proposed, one of which is the ink composition disclosed in Patent Laid-Open Publication No. 2001-354889, that exhibits adequate penetration and ink discharge stability by containing glycol ether and 1,2-alkanediol.

Patent Laid-Open Publication No. H11-349871 discloses an ink composition containing a colorant, an aqueous carrier, an alkanediol having hydroxy groups at the each terminal, a polyethylene glycol with a molecular weight of about 200 to 5000, a mixture of polyethylene glycol and polypropylene glycol, and a polyol/polyalkylene oxide condensate having a specified structure. These patents show that the respective ink compositions provide an excellent optical density for printed matter and good printing properties for inkjet printers.

However, these ink compositions still have room for improvement in relation to the glossiness of images when printed on glossy media having ink-absorbing layers. Therefore, it is desired that an ink composition that exhibits excellent glossiness on glossy inkjet media should be developed.

SUMMARY

The present invention was made to solve the problems of the prior art. It is an object of the present invention to provide an ink composition and an ink set including such ink composition, where it is possible to form images having reduced uneven glossiness on glossy inkjet media.

After rigorous research, the inventor of the present invention discovered that it is possible to form images with reduced uneven glossiness on glossy inkjet media by using a polyether-modified polysiloxane compound as a surfactant to be contained in the ink composition, and by setting the alkanediol content and the glycol ether content and the weight ratio thereof.

The present invention is based on such discovery, and provides an ink composition containing a pigment, an alkanediol, a glycol ether, a polyether-modified polysiloxane compound, a water-soluble organic solvent, and water, wherein the sum of the contents of alkanediol and glycol ether is 10 wt % or more, but less than 20 wt %.

By obtaining the ink composition as above, it is possible to form images having high glossiness and reduced uneven glossiness on the glossy inkjet media.

The present invention also provides an ink set including the ink compositions. By using such ink set, it is possible to reduce gloss differences between colors of the respective ink compositions in the ink set, and to prevent uneven glossiness.

The present invention further provides a recording method for printing by making an ink composition adhered onto a recording medium, and the above ink compositions are used in this recording method.

Since the ink compositions obtained as above are used in this recording method, it is possible to form print images having high glossiness and reduced uneven glossiness between colors, even when glossy inkjet media is used.

The present invention further provides an ink-jet recording method for printing by jetting drops of an ink composition onto a recording medium, and any of the aforementioned ink compositions is used in this ink-jet recording method.

Since the ink compositions obtained as above are used in this inkjet recording method, it is possible to form print images having reduced uneven glossiness between colors, even when glossy inkjet media is used.

The ink compositions of the present invention ensure that the images printed on glossy inkjet media have high glossiness and reduced uneven glossiness. Examples of the recording methods where the ink compositions of the present invention are used include recording methods in which writing instruments (e.g., pens) are used; the inkjet recording method; and various other printing methods. Among these methods, the recording method of the present invention is preferably used in the ink-jet recording method, in which drops of the ink compositions are jetted and made adhered to the recording medium.

DESCRIPTION OF THE PREFERRED EMBODIMENTS

The ink composition of the present invention contains a polyether modified polysiloxane compound as a surfactant. To enhance glossiness, it is preferable to use, for example, a polyether modified organosiloxane compound represented by the following formula, as the polyether modified polysiloxane used in this ink composition.

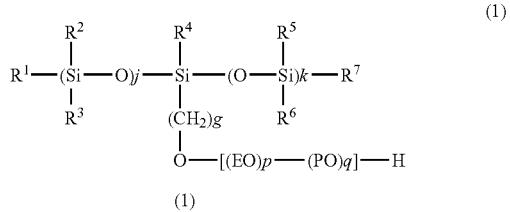

(1)

(In this formula, each of $R^1$ to $R^7$ independently represents a $C_{1-6}$ alkyl group; each of g, j, and k independently represents an integer number equal to 1 or greater; EO represents an ethyleneoxy group; PO represents a propyleneoxy group; p and q are both integer numbers equal to 0 or greater but the sum of p and q is an integer number equal to 1 or greater; and EO and PO may be random or block, with the order thereof in the brackets [ ] being irrelevant.)

Regarding the polyether modified organosiloxane compound expressed by the general formula (1), it is preferable that each of $R^1$ to $R^7$ independently represents an alkyl group, more preferably a methyl group having 1 to 6 carbons. Each of g, j, and k, independently represents an integer number equal to 1 or greater, preferably integer numbers 1 to 2. P and q are integer numbers equal to 0 or more, but the sum of p and q is an integer number equal to 1 or greater, preferably an integer number 2 to 4.

As the compound expressed by the general formula (1), it is preferable to use, for example, a compound that satisfies j=k+g. It is also preferable to use a compound in which each of $R^1$ to $R^7$ is a methyl group, j is 2, k is 1, g is 1, p is an integer number equal to 1 or greater, and q is 0.

Compounds that can be expressed by the general formula (1) are commercially available and it is possible to use such compounds. For example, silicon surfactants, BYK-345, BYK-346, BYK-347, or BYK-348 (all available from BYK-Chemie Japan) may be used.

The amount of the polyether-modified polysiloxane compound added to the ink composition may be appropriately selected, but it is preferable for the amount to be in a range of 0.03 to 3 wt %, more preferably 0.1 to 2 wt %, and most preferably 0.3 to 1 wt % relative to the ink composition.

The ink composition of the present invention contains alkanediol, preferably 1,2-alkanediol. As for the 1,2-alkanediol, 1,2-alkanediol having 4 to 6 carbons, for example, 1,2-butanediol, 1,2-pentanediol, or 1,2-hexanediol is preferably used in terms of enhancing glossiness and preventing bleeding.

In a preferred embodiment of the present invention, to enhance the stability for the dispersion of the pigment in the ink composition, the 1,2-alkanediol is selected from the group consisting of 1,2-butanediol, 1,2-pentanediol, and 1,2-hexanediol.

In a more preferred embodiment of the present invention, the 1,2-alkanediol is preferably 1,2-hexanediol or 1,2-pentanediol. It is most preferable that 1,2-hexanediol should be used. In the present invention, these substances may either be used alone or two or more of them can be used together.

The amount of alkanediol added to the ink composition is selected considering the amount of glycol ether added to the ink, which will be described later. However, it is preferable for the amount to be in the range of 3 to 20 wt %, more preferably of 4 to 18 wt %, and most preferably of 5 to 15 wt % relative to the ink composition.

In the ink composition of the present invention, a glycol ether is used. Examples of the glycol ether include ethylene glycol monomethyl ether, ethylene glycol monoethyl ether, ethylene glycol monobutyl ether, ethylene glycol monomethyl ether acetate, diethylene glycol monomethyl ether, diethylene glycol monoethyl ether, diethylene glycol mono-n-propyl ether, ethylene glycol mono-iso-propyl ether, diethylene glycol mono-iso-propyl ether, ethylene glycol mono-n-butyl ether, ethylene glycol mono-t-butyl ether, diethylene glycol mono-n-butyl ether; triethylene glycol mono-n-butyl ether; diethylene glycol mono-t-butyl ether, 1-methyl-1-methoxybutanol, propylene glycol monomethyl ether, propylene glycol monoethyl ether, propylene glycol mono-t-butyl ether, propylene glycol mono-n-propyl ether, propylene glycol mono-iso-propyl ether, propylene glycol mono-n-butyl ether, dipropylene glycol mono-n-butyl ether, dipropylene glycol monomethyl ether, dipropylene glycol monoethyl ether, dipropylene glycol mono-n-propyl ether, and dipropylene glycol-iso-propyl ether.

In a preferred embodiment of the present invention, it is preferable that, among these glycol ethers, a polyhydric alcohol alkyl ether should be used. In particular, in terms of ink penetration, it is preferable to use ethylene glycol monomethyl ether, ethylene glycol monobutyl ether, diethylene glycol monomethyl ether, diethylene glycol monoethyl ether, diethylene glycol monobutyl ether, triethylene glycol monomethyl ether, triethylene glycol monoethyl ether, or triethylene glycol monobutyl ether. Among these, it is most preferable to use triethylene glycol monobutyl ether.

The amount the glycol ether added to the ink composition is determined considering the added amount alkanediol which was described earlier. However, it is preferable for the amount to be in the range of 1 to 20 wt %, more preferably of 2 to 15 wt %, and most preferably of 3 to 10 wt % relative to the ink composition.

When the total weight of the ink composition is set as a reference (100 wt %), the sum of the contents of alkanediol and glycol ether is 10 wt % or more but less than 20 wt %.

By setting the alkanediol content and the glycol ether content, it is possible to reduce the differences in glossiness between colors. Consequently, the uneven glossiness of images printed on glossy media can be reduced.

If it is desired to enhance only the gloss levels of the images, ink compositions can be prepared by simply combining alkanediol and the polyether modified polysiloxane compound. However, when such ink compositions are used in an ink set, the gloss differences between the colors become evident, making uneven glossiness even more apparent. But, if ink compositions are prepared by combining an alkanediol, a glycol ether, and a polyether-modified polysiloxane compound, the gloss differences between the colors are reduced, and uneven glossiness is reduced.

When the sum of the contents of alkanediol and glycol ether is less than 10 wt %, the gloss levels will decrease. However, when the sum exceeds 20 wt %, the viscosity of the ink composition increases, making it inappropriate for such ink composition to be used in an inkjet printer.

The weight ratio of the alkanediol and the glycol ether (alkanediol/glycol ether) is in the range of 0.7 to 4, preferably in the range of 0.8 to 2.5, and most preferably in the range of 1.0 to 1.5.

Since the reflection intensity of each color changes according to the weight ratio of the alkanediol and the glycol ether, if the weight ratio is set as above, the gloss differences between the colors can be made smaller and the uneven glossiness can be reduced.

The colorant used in the present invention is a pigment. It is not necessary to limit the types of pigment to obtain the effects of the present invention, and any inorganic or organic pigment can be used.

As inorganic pigments, it is possible to use, in addition to titanium oxide and iron oxide, carbon black which is manufactured using a publicly known method such as the contact method, the furnace method or the thermal method.

Examples of organic pigments include: azo pigments such as insoluble azo pigments, condensed azo pigments, azo lake, and chelated azo pigments; polycyclic pigments such as phthalocyanine pigments, perylene pigments, perinone pigments, anthraquinone pigments, quinacridone pigments, dioxazine pigments, thioindigo pigments, isoindolinone pigments, and quinophthalone pigments; dye chelates (e.g. basic dye chelates, acid dye chelates etc.); nitro pigments; nitroso pigments; aniline black; and fluorescent pigments. Each can either be used alone or in a plurality, mixed together.

Examples of the pigment used as carbon black include the following: No. 2300, No. 900, HCF88, No. 33, No. 40, No. 45, No. 52, MA7, MA8, MA100, No. 2200B and other pigments manufactured by Mitsubishi Chemical Corporation; Raven 5750, Raven 5250, Raven 5000, Raven 3500, Raven 1255, Raven 700 and other pigments manufactured by Columbian Chemicals Company; Regal 400R, Regal 330R, Regal 660R, Mogul L, Mogul 700, Monarch 800, Monarch 880, Monarch 900, Monarch 1000, Monarch 1100, Monarch 1300, Monarch 1400 and other pigments manufactured by Cabot Corporation; and Color Black FW1, Color Black FW2V, Color Black FW18, Color Black FW200, Color Black S150, Color Black S160, Color Black S170, Printex 35, Printex U, Printex V, Printex 140U, Special Black 6, Special Black 5, Special Black 4A, Special Black 4 and other pigments which are manufactured by Degussa Corporation. Each can be used either alone or in a plurality mixed together.

As to the pigment used for a yellow ink composition, it is preferable to use one or more pigments selected from the group consisting of C.I. pigment yellows 1, 2, 3, 12, 13, 14, 16, 17, 73, 74, 75, 83, 93, 95, 97, 98, 109, 110, 114, 128, 129, 138, 150, 151, 154, 155, 180, and 185. Out of these, it is particularly preferable to use one or more selected from the group consisting of C.I pigment yellows 74, 109, 110, 128, and 138.

As to the pigment used for a magenta ink composition and a light magenta ink composition, it is preferable to use one or more pigments selected from the group consisting of C.I. pigment reds 5, 7, 12, 48 (Ca), 48 (Mn), 57 (Ca), 15:1, 112, 122, 123, 168, 184, 202, 209, and C.I. pigment violet 19. Out of these, it is particularly preferable to use one or more pigments selected from the group consisting of C. I. pigment reds 122, 202, 209, and C.I. pigment violet 19.

As to the pigment used for a cyan ink composition and a light cyan ink composition, it is preferable to use one or more pigments selected from the group consisting of C.I. pigment blues 1, 2, 3, 15:3, 15:4, 15:34, 16, 22, and 60, and C.I. vat blues 4 and 60. Out of these, it is particularly preferable to use one or more pigments selected from the group consisting of C.I. pigments blue 15:3, 15:4, and 60.

As to the pigment used for an orange ink composition, it is preferable to use one or more pigments selected from the group consisting of C.I. pigment oranges 5, 36, 43, and 62.

As to the pigment used for a red ink composition, it is preferable to use one or more pigments selected from the group consisting of C.I. pigment reds 17, 49:2, 112, 149, 177, 178, 188, 255, and 264. Out of these, it is particularly preferable to use one or more pigments selected from the group consisting of C.I. pigment reds 149, 177, 178, and 264.

As to the pigment used for a blue ink composition, it is preferable to use C.I. pigment blue 60.

As to the pigment used for a violet ink composition, it is preferable to use one or more pigments selected from the group consisting of C.I. pigment violets 3, 19, 23, 32, 36, and 38. Out of these, it is particularly preferable to use C. I. pigment violets 19 or 23, or both.

As to the pigment used for a green ink composition, it is preferable to use one or more pigments selected from the group consisting of C.I. pigment greens 1, 4, 7, 8, 10, 17, 18, and 36.

In a preferred embodiment of the present invention, it is preferable to use a pigment having a mean particle diameter of 50 to 200 nm. The amount of pigment added may be appropriately selected to the extent that an adequate image density can be achieved. However, it is preferable for the amount to be 0.5 to 15 wt % relative to the ink composition.

The pigment content (in terms of solids) used in the present invention may be appropriately selected, but it is preferable for the amount to be 3 wt % or less, and more preferably in a range of 1 to 3 wt %, relative to the ink composition.

In a preferred embodiment of the present invention, in terms of the dispersion stability of the pigment in the ink composition, the ink composition further contains a dispersion resin for dispersing the pigment in the ink composition. It is preferable for the pigment of the present invention to be added to the ink in the form of a pigment-dispersed liquid obtained by dispersing the pigment in a water-based solvent using the dispersion resin.

As a dispersant preferable for the ink composition of the present invention, it is possible to use a dispersant that is commonly used in the preparation of pigment-dispersed liquids, for example, a macromolecular dispersant.

As to the preferable macromolecular dispersant for the ink composition of the present invention, natural macromolecules may be used, for example, proteins such as glue, gelatin, casein, and albumin; natural rubber such as gum arabic and tragacanth gum; glucosides such as saponin; alginic acid derivatives such as alginic acid, alginic acid propyleneglycol ester, triethanolamine alginate, and ammonium alginate; and cellulose derivatives such as methylcellulose, carboxymethylcellulose, hydroxyethylcellulose, and ethylhydroxyethylcellulose.

Moreover, synthetic macromolecules may also be used as the preferable macromolecular dispersant. Examples of synthetic macromolecules include: acrylic copolymers such as polyvinylalcohols, polyvinylpyrolidones, polyacrylic acid, acrylic acid-acrylonitrile copolymer, potassium acrylate-acrylonitrile copolymer, vinyl acetate-acrylate ester copolymer, and acrylic acid-alkyl acrylate ester copolymer; styrene-acrylic acid resins such as styrene-acrylic acid copolymer, styrene-methacrylic acid copolymer, styrene-methacrylic acid-acrylic alkyl ester copolymer, stryene-alpha-methylstyrene-acrylic acid copolymer, and stryene-alpha-methylstyrene-acrylic acid-acrylic alkyl ester copolymer; styrene-maleic acid; styrene-maleic anhydride; vinylnaphthalene-acrylic acid copolymer; vinylnaphthalene-maleic acid copolymer; and vinyl acetate copolymers such as vinyl acetate-ethylene copolymer, vinyl acetate-fatty acid vinyl ester-ethylene copolymer, vinyl acetate-maleic acid ester copolymer, vinyl acetate-crotonic acid copolymer, and vinyl acetate-acrylic acid copolymer; and the salts thereof.

Among the above, particularly preferable are: macromolecular compounds having carboxyl groups (preferably in the form of salts) (e.g., styrene-acrylic acid resins, styrene-maleic acid resin, styrene-maleic anhydride resin, vinylnaphthalene-acrylic acid copolymer, vinylnaphthalene-maleic acid copolymer, and vinyl acetate-acrylic acid copolymer); copolymers formed from monomers having a hydrophobic group and monomers having a hydrophilic group; and polymers formed from monomers having both a hydrophobic group and hydrophilic group in their molecular structures.

Examples of the salts include diethylamine, ammonia, ethylamine, triethylamine, propylamine, isopropylamine, dipropylamine, butylamine, isobutylamine, triethanolamine, diethanolamine, aminomethylpropanol, and morpholine. The average molecular weight of these (co)polymers is preferably 3,000 to 30,000, and more preferably 5,000 to 15,000.

The amount of the dispersion resin added may be appropriately selected, but is preferably 0.5 to 5 wt %, and more preferably 1 to 3 wt % relative to the ink composition.

The ink composition of the present invention contains water and a water-soluble organic solvent. Examples of the water-soluble organic solvent of the present invention include glycerin, ethylene glycol, diethylene glycol, triethylene glycol, tetraethylene glycol; propylene glycol, dipropylene glycol, tripropylene glycol, polyethylene glycol with its molecular weight being 2,000 or less, 1,3-propylene glycol, isopropylene glycol, isobutylene glycol, 1,4-butanediol, 1,3-butanediol, 1,5-pentaediol, 1,6-hexanediol, meso-erythritol, and pentaerythritol. Among these, it is preferable for glycerin to be used.

These water-soluble organic solvents preferably enhance the solubility of other contained components into the ink composition, improve penetration of the ink into a recording medium such as paper, and effectively prevent nozzle clogging.

The amount of the water-soluble organic solvent added to the ink composition may be appropriately selected, but it is preferable for the amount to be about 1 to 30 wt %, and more preferably, about 5 to 15 wt % relative to the ink composition.

The ink composition of the present invention may further contain nozzle anti-clogging agents, preservatives, antioxidants, electrical conductivity adjusting agents, pH regulators, viscosity adjusting agents, surface tension adjusting agents, and oxygen absorbents.

Examples of the preservatives or fungicides include: sodium benzonate; sodium pentachlorophenol; 2-pyridine thiol-1-oxide; sodium sorbate; sodium dehydroacetate; and 1,2-dibenzine thiazoline-3-one (Proxel CRL, Proxel BND, Proxel GXL, Proxel XL-2, and Proxel TN, all are available from Avecia Limited).

Examples of the pH regulators, dissolution accelerators or antioxidants include amines and transformations thereof such as diethanolamine, triethanolamine, propanolamine, and morpholine; inorganic salts such as potassium hydroxide, sodium hydroxide, and lithium hydroxide; ammonium hydroxide; quaternary ammonium hydroxide (tetramethylammonium, etc.); carbonates such as potassium carbonate, sodium carbonate, and lithium carbonate; phosphates; ureas such as N-methyl-2-pyrrolidone, urea, thiourea, and tetramethylurea; alohanates such as alohanate and methyl alohanate; biurets such as biuret, dimethyl buiret, tetramethyl biuret; and L-ascorbic acid, and salt thereof.

The ink composition of the present invention may contain antioxidants and UV absorbing agents, for example, Tinuvin 328, 900, 1130, 384, 292, 123, 144, 622, 770 and 292 available from Ciba-Geigy Japan Limited; Irgacor 252 and 153; Irganox 1010, 1076 and 1035; MD1024; and lanthanide oxides.

The ink composition of the present invention may be prepared, for example, by dispersing and mixing the aforementioned components according to an appropriate method. At first, a pigment, a dispersant, and water are preferably mixed using an appropriate disperser (e.g., ball mill, sandmill, atrighter, roll mill, agitator mill, Henshell mixer, colloid mill, supersonic homogenizer, jet mill, ong mill) and made into a homogeneous pigment-dispersed liquid. At the same time, components other than the pigment and the dispersant are mixed and made into an ink solvent. The obtained pigment-dispersed liquid is dripped into this ink solvent while being agitated. Optionally, saccharides, pH regulators, preservatives, fungicides and other agents may be added and dissolved thoroughly into the ink solution. After fully being agitated, the ink solution is filtered to remove large coarse particles and foreign matter which can cause clogging. Thus, an ink composition is obtained.

The present invention provides a recording method for printing by making the ink composition adhered onto a recording medium, wherein the aforementioned ink composition is used.

Since the ink composition obtained as above is used in the recording method of the present invention, when a glossy inkjet medium is used, it is possible to form print images having good glossiness and reduced uneven glossiness between the colors.

Moreover, the present invention provides recorded matter formed using the aforementioned ink composition.

Since the recorded matter of the present invention is formed using the ink compositions obtained as above, even when a glossy inkjet medium is used, it is possible to form print images having reduced uneven glossiness between the colors.

Examples of the recorded matter of the present invention include recorded matter having print images in which uneven glossiness is reduced even when printed on the glossy ink-jet medium.

EXAMPLES

The present invention is now explained in detail referring to the following examples. These examples, however, shall not limit the scope of the present invention.

<Ink Preparation>

A pigment, a styrene-acrylic acid copolymer as a dispersant, and water were thoroughly mixed, and this mixture was dispersed in a sand mill (manufactured by Yasukawa Seisakusyo) together with glass beads (diameter=1.7 mm; 1.5 times the weight of the mixture) for two hours. After dispersion, the glass beads were removed, and a pigment-dispersed liquid was obtained.

In addition to the obtained pigment-dispersed liquid, components other than the pigment and the dispersant were mixed and made into an ink solvent. This ink solvent was dripped gradually into the pigment-dispersed liquid and this mixture was thoroughly stirred for twenty minutes at room temperature. Then, the mixture was filtered by using a membrane filter having a pore size of 5 μm. Finally, an ink composition was obtained.

Example 1

Ink Set 1

| Cyan ink composition | |
|---|---|
| C.I. pigment blue 15:3 | 2.0 wt % |
| Styrene-acrylic acid copolymer (dispersant) | 1 wt % |
| 1,2-hexanediol | 8 wt % |
| Triethylene glycol monobutyl ether | 10 wt % |
| Diethylene glycol | 10 wt % |
| BYK 348 (manufactured by BYK-Chemie Japan) | 0.3 wt % |
| Ion-exchange water | Remainder |
| Magenta ink composition | |
| C.I. pigment red 122 | 2.0 wt % |
| Styrene-acrylic acid copolymer (dispersant) | 1 wt % |
| 1,2-hexanediol | 8 wt % |
| Triethylene glycol monobutyl ether | 10 wt % |
| Glycerin | 5 wt % |
| Diethylene glycol | 5 wt % |
| BYK 348 (manufactured by BYK-Chemie Japan) | 0.3 wt % |
| Ion-exchange water | Remainder |
| Yellow ink composition | |
| C.I. pigment yellow 74 | 3.0 wt % |
| Styrene-acrylic acid copolymer (dispersant) | 1 wt % |
| 1,2-hexanediol | 8 wt % |
| Triethylene glycol monobutyl ether | 10 wt % |
| Glycerin | 8 wt % |
| BYK 348 (manufactured by BYK-Chemie Japan) | 0.3 wt % |
| Ion-exchange water | Remainder |

-continued

| Black ink composition | |
|---|---|
| Carbon black MA 7 (manufactured by Mitsubishi Chemical Corporation) | 2.0 wt % |
| Styrene-acrylic acid copolymer (dispersant) | 1 wt % |
| 1,2-hexanediol | 8 wt % |
| Triethylene glycol monobutyl ether | 10 wt % |
| Glycerin | 10 wt % |
| BYK 348 (manufactured by BYK-Chemie Japan) | 0.3 wt % |
| Ion-exchange water | Remainder |

Example 2

Ink Set 2

| Cyan ink composition | |
|---|---|
| C.I. pigment blue 15:3 | 3.0 wt % |
| Styrene-acrylic acid copolymer (dispersant) | 1 wt % |
| 1,2-hexanediol | 7.5 wt % |
| Diethylene glycol monobutyl ether | 3 wt % |
| Diethylene glycol | 10 wt % |
| BYK 347 (manufactured by BYK-Chemie Japan) | 0.3 wt % |
| Ion-exchange water | Remainder |
| Magenta ink composition | |
| C.I. pigment red 122 | 3.0 wt % |
| Styrene-acrylic acid copolymer (dispersant) | 1 wt % |
| 1,2-hexanediol | 7.5 wt % |
| Diethylene glycol monobutyl ether | 3 wt % |
| Glycerin | 5 wt % |
| Diethylene glycol | 5 wt % |
| BYK 347 (manufactured by BYK-Chemie Japan) | 0.3 wt % |
| Ion-exchange water | Remainder |
| Yellow ink composition | |
| C.I. pigment yellow 74 | 3.0 wt % |
| Styrene-acrylic acid copolymer (dispersant) | 1 wt % |
| 1,2-hexanediol | 7.5 wt % |
| Diethylene glycol monobutyl ether | 3 wt % |
| Glycerin | 8 wt % |
| BYK 347 (manufactured by BYK-Chemie Japan) | 0.3 wt % |
| Ion-exchange water | Remainder |
| Black ink composition | |
| Carbon black MA 7 (manufactured by Mitsubishi Chemical Corporation) | 2.0 wt % |
| Styrene-acrylic acid copolymer (dispersant) | 1 wt % |
| 1,2-hexanediol | 7.5 wt % |
| Diethylene glycol monobutyl ether | 3 wt % |
| Glycerin | 10 wt % |
| BYK 347 (manufactured by BYK-Chemie Japan) | 0.3 wt % |
| Ion-exchange water | Remainder |

Example 3

Ink Set 3

| Cyan ink composition | |
|---|---|
| C.I. pigment blue 15:3 | 1.5 wt % |
| Styrene-acrylic acid copolymer (dispersant) | 1 wt % |
| 1,2-hexanediol | 5 wt % |
| Triethylene glycol monobutyl ether | 5 wt % |
| Diethylene glycol | 10 wt % |
| BYK 348 (manufactured by BYK-Chemie Japan) | 0.3 wt % |
| Ion-exchange water | Remainder |

-continued

Magenta ink composition

| | |
|---|---|
| C.I. pigment violet 19 | 2.0 wt % |
| Styrene-acrylic acid copolymer (dispersant) | 1 wt % |
| 1,2-hexanediol | 5 wt % |
| Triethylene glycol monobutyl ether | 5 wt % |
| Glycerin | 5 wt % |
| Diethylene glycol | 5 wt % |
| BYK 348 (manufactured by BYK-Chemie Japan) | 0.3 wt % |
| Ion-exchange water | Remainder |

Yellow ink composition

| | |
|---|---|
| C.I. pigment yellow 74 | 3.0 wt % |
| Styrene-acrylic acid copolymer (dispersant) | 1 wt % |
| 1,2-hexanediol | 5 wt % |
| Triethylene glycol monobutyl ether | 5 wt % |
| Glycerin | 8 wt % |
| BYK 348 (manufactured by BYK-Chemie Japan) | 0.3 wt % |
| Ion-exchange water | Remainder |

Black ink composition

| | |
|---|---|
| Carbon black MA 7 (manufactured by Mitsubishi Chemical Corporation) | 1.5 wt % |
| Styrene-acrylic acid copolymer (dispersant) | 1 wt % |
| 1,2-hexanediol | 5 wt % |
| Triethylene glycol monobutyl ether | 5 wt % |
| Glycerin | 10 wt % |
| BYK 348 (manufactured by BYK-Chemie Japan) | 0.3 wt % |
| Ion-exchange water | Remainder |

Example 4

Ink Set 4

Cyan ink composition

| | |
|---|---|
| C.I. pigment blue 15:3 | 2 wt % |
| Styrene-acrylic acid copolymer (dispersant) | 1 wt % |
| 1,2-hexanediol | 7 wt % |
| Diethylene glycol monobutyl ether | 10 wt % |
| Diethylene glycol | 10 wt % |
| BYK 348 (manufactured by BYK-Chemie Japan) | 0.3 wt % |
| Ion-exchange water | Remainder |

Magenta ink composition

| | |
|---|---|
| C.I. pigment red 122 | 2 wt % |
| Styrene-acrylic acid copolymer (dispersant) | 1 wt % |
| 1,2-hexanediol | 7 wt % |
| Diethylene glycol monobutyl ether | 10 wt % |
| Glycerin | 5 wt % |
| Diethylene glycol | 5 wt % |
| BYK 348 (manufactured by BYK-Chemie Japan) | 0.3 wt % |
| Ion-exchange water | Remainder |

Yellow ink composition

| | |
|---|---|
| C.I. pigment yellow 74 | 3.0 wt % |
| Styrene-acrylic acid copolymer (dispersant) | 1 wt % |
| 1,2-hexanediol | 7 wt % |
| Diethylene glycol monobutyl ether | 10 wt % |
| Glycerin | 8 wt % |
| BYK 348 (manufactured by BYK-Chemie Japan) | 0.3 wt % |
| Ion-exchange water | Remainder |

Black ink composition

| | |
|---|---|
| Carbon black MA 7 (manufactured by Mitsubishi Chemical Corporation) | 2.0 wt % |
| Styrene-acrylic acid copolymer (dispersant) | 1 wt % |
| 1,2-hexanediol | 7 wt % |
| Diethylene glycol monobutyl ether | 10 wt % |
| Glycerin | 10 wt % |
| BYK 348 (manufactured by BYK-Chemie Japan) | 0.3 wt % |
| Ion-exchange water | Remainder |

Example 5

Ink Set 5

Cyan ink composition

| | |
|---|---|
| C.I. pigment blue 15:3 | 2 wt % |
| Styrene-acrylic acid copolymer (dispersant) | 1 wt % |
| 1,2-hexanediol | 8 wt % |
| Triethylene glycol monobutyl ether | 2 wt % |
| Diethylene glycol | 10 wt % |
| BYK 348 (manufactured by BYK-Chemie Japan) | 0.3 wt % |
| Ion-exchange water | Remainder |

Magenta ink composition

| | |
|---|---|
| C.I. pigment red 122 | 2 wt % |
| Styrene-acrylic acid copolymer (dispersant) | 1 wt % |
| 1,2-hexanediol | 8 wt % |
| Triethylene glycol monobutyl ether | 2 wt % |
| Glycerin | 5 wt % |
| Diethylene glycol | 5 wt % |
| BYK 348 (manufactured by BYK-Chemie Japan) | 0.3 wt % |
| Ion-exchange water | Remainder |

Yellow ink composition

| | |
|---|---|
| C.I. pigment yellow 74 | 3.0 wt % |
| Styrene-acrylic acid copolymer (dispersant) | 1 wt % |
| 1,2-hexanediol | 8 wt % |
| Triethylene glycol monobutyl ether | 2 wt % |
| Glycerin | 8 wt % |
| BYK 348 (manufactured by BYK-Chemie Japan) | 0.3 wt % |
| Ion-exchange water | Remainder |

Black ink composition

| | |
|---|---|
| Carbon black MA 7 (manufactured by Mitsubishi Chemical Corporation) | 2.0 wt % |
| Styrene-acrylic acid copolymer (dispersant) | 1 wt % |
| 1,2-hexanediol | 8 wt % |
| Triethylene glycol monobutyl ether | 2 wt % |
| Glycerin | 10 wt % |
| BYK 348 (manufactured by BYK-Chemie Japan) | 0.3 wt % |
| Ion-exchange water | Remainder |

Comparative Example 1

Ink Set 6

Cyan ink composition

| | |
|---|---|
| C.I. pigment blue 15:3 | 2.0 wt % |
| Styrene-acrylic acid copolymer (dispersant) | 1 wt % |
| 1,2-hexanediol | 8 wt % |
| Triethylene glycol monobutyl ether | 10 wt % |
| Diethylene glycol | 10 wt % |
| E-1010 | 0.3 wt % |
| Ion-exchange water | Remainder |

Magenta ink composition

| | |
|---|---|
| C.I. pigment red 122 | 2.0 wt % |
| Styrene-acrylic acid copolymer (dispersant) | 1 wt % |
| 1,2-hexanediol | 8 wt % |
| Triethylene glycol monobutyl ether | 10 wt % |
| Glycerin | 5 wt % |
| Diethylene glycol | 5 wt % |
| E-1010 | 0.3 wt % |
| Ion-exchange water | Remainder |

Yellow ink composition

| | |
|---|---|
| C.I. pigment yellow 74 | 3.0 wt % |
| Styrene-acrylic acid copolymer (dispersant) | 1 wt % |
| 1,2-hexanediol | 8 wt % |

-continued

| | |
|---|---|
| Triethylene glycol monobutyl ether | 10 wt % |
| Glycerin | 8 wt % |
| E-1010 | 0.3 wt % |
| Ion-exchange water | Remainder |
| Black ink composition | |
| Carbon black MA 7 (manufactured by Mitsubishi Chemical Corporation) | 2.0 wt % |
| Styrene-acrylic acid copolymer (dispersant) | 1 wt % |
| 1,2-hexanediol | 8 wt % |
| Triethylene glycol monobutyl ether | 10 wt % |
| Glycerin | 10 wt % |
| E-1010 | 0.3 wt % |
| Ion-exchange water | Remainder |

Comparative Example 2

Ink Set 7

| | |
|---|---|
| Cyan ink composition | |
| C.I. pigment blue 15:3 | 2 wt % |
| Styrene-acrylic acid copolymer (dispersant) | 1 wt % |
| 1,2-hexanediol | 4 wt % |
| Triethylene glycol monobutyl ether | 4 wt % |
| Diethylene glycol | 10 wt % |
| BYK 348 (manufactured by BYK-Chemie Japan) | 0.3 wt % |
| Ion-exchange water | Remainder |
| Magenta ink composition | |
| C.I. pigment red 122 | 2 wt % |
| Styrene-acrylic acid copolymer (dispersant) | 1 wt % |
| 1,2-hexanediol | 4 wt % |
| Triethylene glycol monobutyl ether | 4 wt % |
| Glycerin | 5 wt % |
| Diethylene glycol | 5 wt % |
| BYK 348 (manufactured by BYK-Chemie Japan) | 0.3 wt % |
| Ion-exchange water | Remainder |
| Yellow ink composition | |
| C.I. pigment yellow 74 | 3.0 wt % |
| Styrene-acrylic acid copolymer (dispersant) | 1 wt % |
| 1,2-hexanediol | 4 wt % |
| Triethylene glycol monobutyl ether | 4 wt % |
| Glycerin | 8 wt % |
| BYK 348 (manufactured by BYK-Chemie Japan) | 0.3 wt % |
| Ion-exchange water | Remainder |
| Black ink composition | |
| Carbon black MA 7 (manufactured by Mitsubishi Chemical Corporation) | 2.0 wt % |
| Styrene-acrylic acid copolymer (dispersant) | 1 wt % |
| 1,2-hexanediol | 4 wt % |
| Triethylene glycol monobutyl ether | 4 wt % |
| Glycerin | 10 wt % |
| BYK 348 (manufactured by BYK-Chemie Japan) | 0.3 wt % |
| Ion-exchange water | Remainder |

[Evaluation 1: Gloss Evaluation]

The above ink sets were loaded into a PM-4000 PX ink-jet printer (manufactured by Seiko Epson Corporation) to print an image of a figure (SCID sample of the Japanese Standards Association JIS X 9201-1995) on PM photo paper. The glossiness of each printed image was evaluated visually.

A: When a fluorescent light was shone on the printed side of the paper, the light was clearly reflected.

B: When a fluorescent light was shone on the printed side of the paper, the clarity of the reflected light was slightly low.

C: When a fluorescent light was shone on the printed side of the paper, the reflected light was dull and the clarity was poor.

[Evaluation 2: Uneven Glossiness Evaluation]

After printing under the same printing conditions as above, the uneven glossiness of the respective printed images were evaluated visually.

AA: High-quality glossiness was achieved evenly on the printed side of paper.

A: Glossiness was achieved evenly on the printed side of paper, resulting in good printing.

B: Some uneven glossiness occurred on the printed side of paper.

C: Severe uneven glossiness occurred on the printed side of paper, and interference of light (iridescent light) occurred.

Evaluation results were as follows. Indicated in the table below together with the evaluation results are the surfactants used, the sum of the contents of alkanediol (1) and glycol ether (2) in the ink compositions ([(1)+(2)]), and the weight ratio ([(1)/(2)]).

TABLE 1

| Examples | Surfactant | (1) + (2) | (1)/(2) | Evaluation 1 | Evaluation 2 |
|---|---|---|---|---|---|
| Example 1 | BYK 347 | 18 wt % | 0.8 | A | AA |
| Example 2 | BYK 347 | 10.5 wt % | 2.5 | A | AA |
| Example 3 | BYK 347 | 10 wt % | 1.0 | A | AA |
| Example 4 | BYK 348 | 17 wt % | 0.7 | A | A |
| Example 5 | BYK 348 | 12 wt % | 4.0 | A | A |
| Comparative Example 1 | E-1010 | 18 wt % | 0.8 | C | C |
| Comparative Example 2 | BYK 348 | 8 wt % | 1.0 | B | C |

What is claimed is:

1. An ink composition comprising:
   a pigment;
   a dispersion resin for dispersing the pigment;
   at least one alkanediol;
   a glycol ether;
   a polyether-modified polysiloxane compound;
   a water-soluble organic solvent; and
   water,
   wherein the sum of all alkanediol and glycol ether in the ink composition is 10 wt % or more, but less than 20 wt %.

2. The ink composition according to claim 1, wherein a weight ratio of alkanediol to glycol ether is in a range of 0.7 to 4.

3. The ink composition according to claim 1, wherein the polyether modified polysiloxane compound is a polyether modified organosiloxane compound represented in the following formula

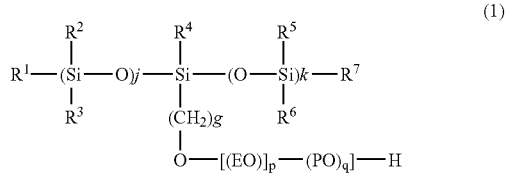

wherein each of $R^1$ to $R^7$ independently represents a $C_{1-6}$ alkyl group; each of g, j, and k independently represents an integer number equal to 1 or greater; EO represents an ethyleneoxy group; PO represents a propyleneoxy group; p and q are both integer numbers equal to 0 or greater but the sum of p and q is an integer number equal to 1 or greater; and EO and PO may be random or block, regardless of the order in the square brackets [ ].

4. The ink composition according to claim 1, wherein the at least one alkandiol is selected from the group consisting of 1,2-butanediol, 1,2-pentadiol, and 1,2-hexanediol.

5. The ink composition according to claim 1, wherein the glycol ether comprises a polyhydric alcohol alkyl ether.

6. The ink composition according to claim 5, wherein the polyhydric alcohol alkyl ether is selected from the group consisting of ethylene glycol monoethyl ether, ethylene glycol monobutyl ether, diethylene glycol monomethyl ether, diethylene glycol monoethyl ether, diethylene glycol monobutyl ether, triethylene glycol monomethyl ether, triethylene glycol monoethyl ether, and triethylene glycol monobutyl ether.

7. The ink composition according to claim 1, wherein the concentration of the pigment contained in the ink composition is 3.0 wt % or less in terms of solids.

8. An ink set comprising the ink composition according to claim 1.

9. A recording method for printing comprising (a) providing the ink composition according to claim 1, and (b) making the ink composition adhere to a recording medium.

10. An inkjet recording method for printing by jetting drops of an ink composition onto a recording medium, wherein the ink composition according to claim 1 is used as the ink composition for this method.

11. A recorded matter recorded by the recording method according to claim 9.

* * * * *